United States Patent [19]

Flem

[11] Patent Number: 5,145,265
[45] Date of Patent: Sep. 8, 1992

[54] DOUBLE FLANGE POP-IN BEARING

[75] Inventor: Per E. Flem, Cincinnati, Ohio

[73] Assignee: Performance Plastics, Cincinnati, Ohio

[21] Appl. No.: 778,705

[22] Filed: Oct. 18, 1991

[51] Int. Cl.⁵ .................. F16C 33/08; F16C 33/20
[52] U.S. Cl. ................................. 384/296; 384/276
[58] Field of Search ................. 384/295–301, 384/276, 275, 280

[56] References Cited

U.S. PATENT DOCUMENTS

| | | | |
|---|---|---|---|
| 1,849,963 | 3/1932 | Snow | 384/296 |
| 2,675,283 | 4/1954 | Thomson | 384/299 |
| 3,033,623 | 5/1962 | Thomson | 384/299 |
| 3,438,686 | 4/1969 | Stone | 384/296 |
| 4,624,585 | 11/1986 | Nix et al. | 384/295 X |
| 4,913,562 | 4/1990 | Rosen | 384/276 |

FOREIGN PATENT DOCUMENTS 825056 12/1959 United Kingdom .............. 384/297

Primary Examiner—Thomas R. Hannon
Attorney, Agent, or Firm—Wood, Herron & Evans

[57] ABSTRACT

A double flange pop-in bearing produced from a polymeric material for use with various diameter workpieces. The bearing has a longitudinal gap, preferably along the diagonal, with upper and lower flanges to permit insertion into the workpiece by compression and locking of the bearing into place by the effect of the flanges. The top and bottom edges of the bearing are further characterized by notches extending from the longitudinal gap to facilitate compression for insertion into a bore. The bearing may have an optional projection to mate with a notch in the workpiece to restrict rotation of the bearing in the workpiece.

8 Claims, 1 Drawing Sheet

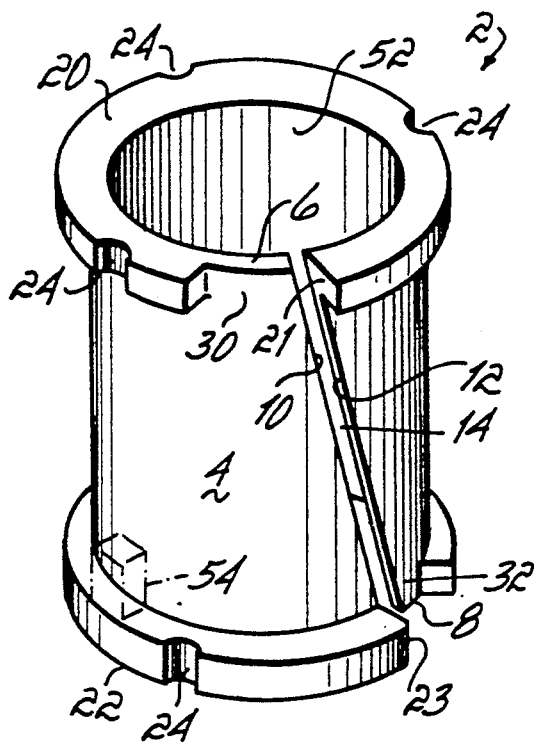
FIG. 1
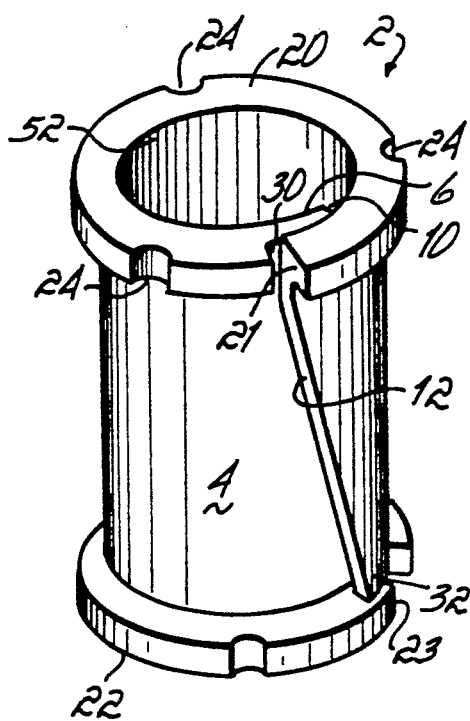
FIG. 2
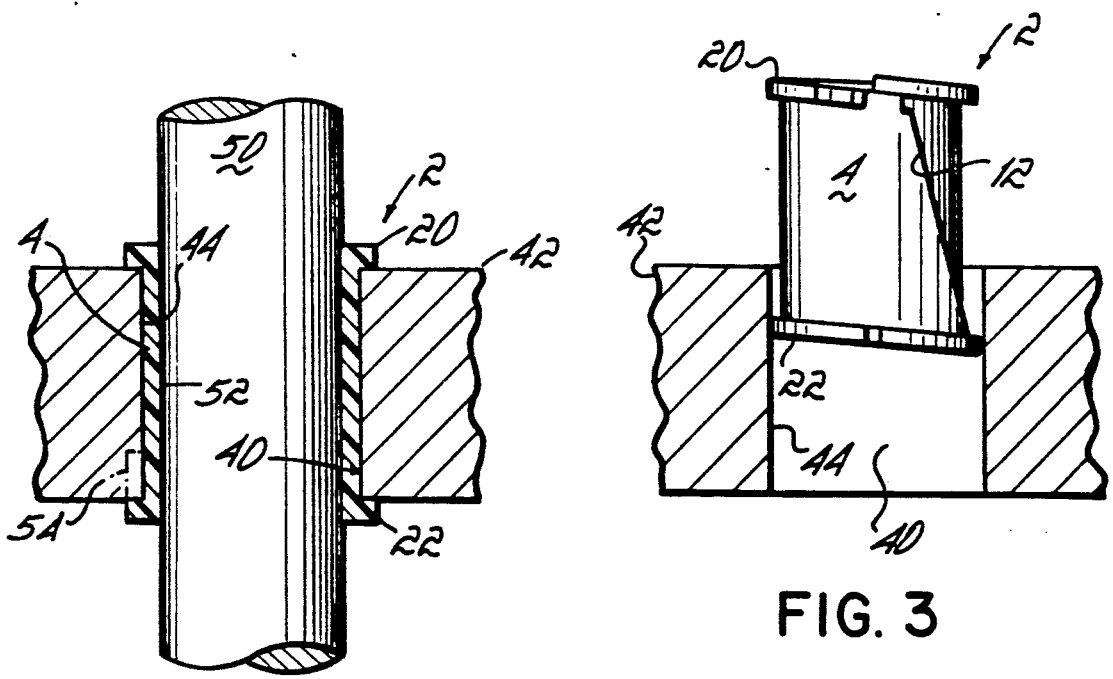
FIG. 4
FIG. 3

DOUBLE FLANGE POP-IN BEARING

FIELD OF THE INVENTION

The invention relates to an improved bearing for insertion into work pieces of various thicknesses.

BACKGROUND OF THE INVENTION

In a number of mechanical applications involving the movement of a shaft relative to a fixed work piece, friction between the shaft and the workpiece results in premature wear of one or both parts with consequent formation of filings which cause additional wear, and generation of heat. To extend the working life of the shaft and the work piece, it is desirable to minimize the surface wear on the work piece and the shaft. It is known to decrease the wear and friction by use of an appropriate lubricant applied to the contacting surfaces. However, the lubricant must be periodically replenished. Further, the lubricant does not provide support to the shaft as it moves relative to the work piece, increasing the prospect of wear with formation of filings.

For reducing friction between a moving shaft and a workpiece and for providing support for the shaft it is known to use a bearing which surrounds the moving shaft and fits inside the bore of the workpiece. Though various bearings can be used, of particular importance is a bearing produced from a polymeric material which can be fit into the bore of the workpiece to surround the shaft and thereby minimize frictional contact between the shaft and the workpiece.

A bearing of this type must be adjustable in diameter to allow insertion into the workpiece bore, as well as to accommodate slight variations in the diameter of the shaft and the bore. Further, the bearing must be formed so that it does not work its way out of the bore in the workpiece during operation. Typically, flanges are provided at the edges of the bearing to resist longitudinal movement of the bearing from the workpiece bore.

It is known to employ bearings in sheet metal to reduce the friction of a shaft inserted through a bore in the sheet metal. A bearing of this type is manufactured by Thomson Industries, Inc., Port Washington, N.Y., and Performance Plastics, Incorporated, Cincinnati, Ohio. The bearing is comprised of a cylindrical side wall having a gap cut therein, a small flange on one end of the side wall, and a large flange located on the opposite end of the side wall. After the small flange has been fit into the sheet metal workpiece bore, and a shaft inserted inside the cylindrical bearing wall, the rotating, oscillating or linearly moving shaft will deposit debris into the gap of the bearing, keeping the shaft surface relatively clean. If the movement of the shaft is rotational or oscillatory, the bearing will typically rotate with the shaft because there is no means at the bearing-bore interface for preventing rotation of the bearing inside the sheet metal bore.

In a modification of this standard type of sheet metal bearing, Performance Plastics, Inc. developed a pop-in bearing which has a sidewall, a top edge with two outward extending lips thereon and a bottom edge with a wide flange, albeit having notches therein. This type of bearing was designed for sheet metal applications where the bore is created by stamping a nearly circular hole, leaving a small tab extending into the aperture. This tab is bent away from the aperture, creating a projection which mates with one of the notches in the wide flange of the bearing. As before, the sidewall has a gap to allow the bearing to be used in bores having slightly differing diameters. This pop-in bearing is restrained from rotating with the shaft by the mating of the sheet metal tab with the bearing flange notch. The outward projecting lip on the upper edge of the bearing restricts longitudinal movement of the bearing in the sheet metal workpiece bore.

Though the above bearings are useful in the applications where the workpiece is of relatively narrow thickness, such as with sheet metal, the bearings are not as useful in thicker workpiece applications. As the workpiece thickness increases the bearing sidewall length therefore must also increase, rendering the bearing more flexible and thus more likely to work out of the bore of the workpiece. If the bearing sidewall is stiffened to counteract this tendency, it becomes difficult to insert the bearing into the workpiece.

SUMMARY OF THE INVENTION

It has been found that a bearing useful in larger workpiece applications can be produced. Instead of an arrangement for the bearing having a wide flange and a narrow flange at opposite ends of the sidewall, the invention relates to a bearing with a longitudinal gap having flanges of essentially equal size on both the top and bottom edges of the sidewall. In applications requiring sidewall lengths of greater than 0.160 inches, the bearing consists of a sidewall having a longitudinal ga therein and flanges of equal size on the upper and lower edges of the sidewall. The longitudinal gap permits one side of the sidewall to be folded under the other side of the sidewall, compressing the diameter of the bearing and permitting insertion into the workpiece bore. Further, the flange is absent on one side only of the longitudinal gap along both the top and bottom edges of the bearing for a short distance. Preferably, the absent sections of flange, or flange gaps, along the top and bottom edges are on opposite sides rather than on the same side of the longitudinal gap. This type of construction permits the sidewall along one side of the longitudinal gap to slide under the sidewall opposite the gap, and to be more easily compressed. The flange gaps are created either in the molding process itself, or are filed or cut away after formation. Location of flange gaps on opposite sides of the longitudinal gap produces a bearing having more uniform rigidity around the circumference compared to a bearing with upper and lower flange gaps on the same side of the longitudinal gap. Compression of the bearing is further facilitated by creation of regularly spaced notches in the flanges thereby permitting easier flexing of the flanges and thereby the bearing.

To better understand the workings of the invention, reference is made to the figures of which:

DESCRIPTION OF DRAWINGS

FIG. 1 is a perspective of the double flange pop-in bearing, uncompressed.

FIG. 2 is a perspective of the double flange pop-in bearing, compressed.

FIG. 3 is a cross sectional view, partly in elevation, of the compressed double flange pop-in bearing during insertion into the bore of a workpiece.

FIG. 4 is a cross sectional view, partly in elevation, showing the double flange pop-in bearing in position in the bore of the workpiece, with a shaft run therethrough.

DETAILED DESCRIPTION OF THE INVENTION

In its broader aspects, the invention relates to a double flange pop-in bearing, comprising a substantially cylindrical sidewall having top and bottom edges and facing first and second longitudinal edges extending from the top edge to the bottom edge, the longitudinal edges defining a longitudinal gap therebetween; an upper flange extending outwardly from a major portion of the top edge, a minor portion thereof defining an upper flange gap; and a lower flange extending outwardly from a major portion of the bottom edge, a minor portion thereof defining a lower flange gap. Preferably, the lower flange has the same width as the upper flange.

The sections of flange absent from the top and bottom edges, identified as flange gaps, begin at the longitudinal edge and preferably are arranged on opposite sides of the longitudinal gap.

Referring to the drawings, FIG. 1 shows bearing 2 in its uncompressed state. Bearing 2 is comprised of a sidewall 4 having a top edge 6 and bottom edge 8. The sidewall 4 is essentially cylindrical and is interrupted at longitudinal edge 10 and second longitudinal edge 12 to create a longitudinal gap 14. Positioned outward of top and bottom edges 6 and 8 respectively are upper flange 20 and lower flange 22 respectively having flange ends 21 and 23. The bearing 2 is rendered more flexible to compression by the presence of flange notches 24 around the periphery of upper flange 20 and lower flange 22. The figure depicts three notches 24 around upper flange 20. Lower flange 22 also has three notches 24, but two are on the back side of the bearing 2, out of view. Generally, the number of notches 24 on the upper and lower flanges 20 and 22 are equal to produce equivalent flexibility in both flanges. The number of notches may vary depending on the flexibility desired. Also, the notches 24 are generally evenly spaced around the periphery of upper and lower flanges 20 and 22. As will be discussed in more detail below, compression of the bearing 2 is facilitated by the presence of upper flange gap 30 and lower flange gap 32.

FIG. 2 depicts bearing 2 in the compressed state prior to insertion into a workpiece bore. As the figure demonstrates, compression in this instance causes the first longitudinal edge 10 (hidden from view) to slide under second longitudinal edge 12 and along sidewall 4. Further, upper flange gap 30 receives the end 21 of upper flange 20. The length of flange gaps 30 and 32 is related to the width of upper flange 20 and lower flange 22. As the flange width increases, it is necessary for bearing 2 to be compressed further to permit insertion into the workpiece. Thus, the upper flange gap 30 and lower flange gap 32 must be increased in length to permit increased compression.

FIG. 3 shows the bearing 2 in the compressed state as it is inserted into the bore 40 of workpiece 42. As the bearing 2 is inserted, lower flange 22 may contact the inside support surface 44 of workpiece 42 which defines the diameter of bore 40.

FIG. 4 depicts the bearing 2 fully inserted into the bore 40 of workpiece 42. The sidewall 4 of bearing 2 is in contact with the inside support surface 44 of workpiece 42 along essentially the entire area of sidewall 4. After insertion of bearing 2, a shaft 50 can then be inserted and placed in motion relative to the workpiece 42. The motion of the shaft may be rotational about the axis, oscillatory about the axis, or translational along the axis. The longitudinal gap 14 which reforms after proper insertion of the bearing 2 into bore 40 acts to collect dirt and other particles on the outside surface of shaft 50 as it moves across the gap 14. It it advantageous to cut the longitudinal gap 14 along a diagonal to provide a solid support to the shaft 50 over the entire range of motion of the shaft. The diagonal gap permits the shaft 50 to be supported continuously within the bearing. Because the longitudinal gap 14 runs on an angle relative to the axis of shaft 50, the shaft can rotate within the bearing 2 without deviating from its axis of rotation, thus improving the wear characteristics of the inside surface 52 of the bearing 2 in contact with the shaft 50. Further, the longitudinal gap 14 may serve as a reservoir for lubricants. FIGS. 1 and 4 also depict the bearing 2 having an optional sidewall projection 54 shown in phantom which contacts the lower flange 22 of the bearing 2. This projection 54 is sized to mate with a corresponding notch in the bore 40 of workpiece 42 to prohibit rotation of the bearing 2 as the shaft 50 is being rotated therein. The sidewall projection 54 may be placed in contact with the lower flange 22, or may be located otherwise on the sidewall 4, so that it mates with a corresponding notch in the bore 40 and limits rotation of the bearing 2.

The bearing 2 is preferably produced by injection molding processes from a variety of materials including Polyimide, Acetal, Nylon and polyphenylene sulfide/polytetrafluoroethylene (PPS/PTFE) blends that resist chemical- and temperature-related deleterious effects while providing low friction and good wear characteristics. No single material is optimum in all applications. Nylon 6/6 is the material of choice in low stress applications where cost is a significant factor. However, where the use requires high temperature stability with internal lubrication in a nylon bearing, typically in automotive applications, one would consider using Zytel 103 HSL nylon resin from DuPont. In applications requiring higher load carrying capability than nylon, coupled with low moisture absorption and cost effectiveness, one can use CELCON M90 acetal from Hoechst Celanese. Where high abrasion resistance is desired, one can combine FORTRON PPS from Hoechst Celanese with KEVLAR fiber from DuPont. In applications involving requiring better wear against metal shafts, one might use a bearing made from a blend of nylon 6/6 filled with PTFE/ultrahigh molecular weight polyethylene. It can thus be seen that a variety of raw material combinations can be used to meet various application requirements; the combination that is ultimately chosen will result from the weighing of cost and working environment considerations.

The bearing 2 is produced in a number of sizes having sidewall lengths typically from 0.160 inch to 6 inches, well in excess of those employed for sheet metal applications only. The thickness of sidewall 4 is typically in the range of 0.030 to 0.060 inch to provide the optimum combination of bearing flexibility and product working life. The bearing 2 has been produced in a variety of diameters, from 0.187 inch to 2.5 inches, though it is expected that even larger diameters can be produced.

The bearing disclosed and described herein has utility in a variety of applications wherein a shaft moves in relation to a workpiece which is either fixed or is moving in slower relation to or in the opposite direction of the shaft. The bearings as described herein are useful in rotating shaft applications requiring low friction, corrosion resistance, and vibration dampening. The bearings of this invention are compatible with other materials such as stainless steel, steel, zinc, aluminum castings, wood, rubber, and plastic.

Having described the invention, it is apparent that there has been provided, in accordance with the invention, a double flange pop-in bearing that fully satisfies the objects, aims, and advantages set forth above. While the invention has been described in conjunction with specific embodiments thereof, it is evident that many alternatives, modifications, and variations will be apparent to those skilled to the art in light of the foregoing description. Accordingly, it is intended to embrace all such alternatives, modifications, and variations that fall within the spirit and broad scope of the appended claims.

I claim:

1. A double-flange pop-in bearing, comprising:
   a substantially cylindrical sidewall having top and bottom edges and facing first and second longitudinal edges extending from said top edge to said bottom edge, said longitudinal edges defining a longitudinal gap therebetween;
   an upper flange extending outwardly along a major portion of the circumference of said top edge, a minor portion thereof defining an upper flange gap;
   and a lower flange extending outwardly along a major portion of the circumference of said bottom edge, a minor portion thereof defining a lower flange gap.

2. The bearing of claim 1, said sidewall having an outwardly facing projection thereon.

3. The bearing of claim 2, said projection on said sidewall contacting at least one of said flanges.

4. The bearing of claim 1, said longitudinal gap defining a diagonal from said top edge to said bottom edge.

5. The bearing of claim 1, said upper flange having at least one notch on the outer periphery thereof.

6. The bearing of claim 1, said lower flange having at least one notch on the outer periphery thereof.

7. The bearing of claim 1, both said upper and lower flanges having at least one notch on the outer periphery thereof.

8. The bearing of claim 1, the length of said sidewall being at least 0.160 inch.

* * * * *